US009104190B2

(12) United States Patent
Neupärtl et al.

(10) Patent No.: US 9,104,190 B2
(45) Date of Patent: Aug. 11, 2015

(54) SAFETY MODULE FOR AN AUTOMATION DEVICE

(75) Inventors: Heinrich Neupärtl, Lampertheim (DE); Gerd Glöckner, Heidelberg (DE); Robert Bohn, Wilhelmsfeld (DE); Peter Erler, Bad Schöborn (DE); Michael Gölz, Karlsruhe (DE)

(73) Assignee: ABB AG, Mannheim (DE)

( * ) Notice: Subject to any disclaimer, the term of this patent is extended or adjusted under 35 U.S.C. 154(b) by 482 days.

(21) Appl. No.: 13/478,754

(22) Filed: May 23, 2012

(65) Prior Publication Data
US 2012/0297101 A1  Nov. 22, 2012

Related U.S. Application Data

(63) Continuation of application No. PCT/EP2010/006520, filed on Oct. 26, 2010.

(30) Foreign Application Priority Data
Nov. 23, 2009  (DE) .......................... 10 2009 054 155

(51) Int. Cl.
G06F 13/14 (2006.01)
G05B 19/05 (2006.01)
(52) U.S. Cl.
CPC .... G05B 19/058 (2013.01); G05B 2219/14012 (2013.01); G05B 2219/15078 (2013.01)
(58) Field of Classification Search
CPC ................. G06B 19/058; G06B 2219/014012; G06B 2219/15078
USPC ................................................ 710/100, 110
See application file for complete search history.

(56) References Cited

U.S. PATENT DOCUMENTS 6,532,508 B2 *  3/2003  Heckel et al. ................. 710/110
6,832,343 B2 * 12/2004  Rupp et al. .................. 714/47.1
(Continued)

FOREIGN PATENT DOCUMENTS

DE  199 28 517 A1  1/2001
DE  103 30 916 A1  2/2005
(Continued)

OTHER PUBLICATIONS

PROFIBUS Working Group 5, "PROFIsafe-Profile for Safety Technology on PROFIBUS DP and PROFINET IO Specification," Mar. 2007, 117 pages, Document Identification TC3-05-006, Version 2.4, published by PROFIBUS Nutzerorganisation e.V., Karlsruhe, Germany.

(Continued)

Primary Examiner — Nimesh G Patel
(74) Attorney, Agent, or Firm — Buchanan Ingersoll & Rooney PC

(57) ABSTRACT

Exemplary embodiments are directed to a safety module for connection to an automation device or automation system which is provided for control of safety critical and non-safety critical processes and/or plant components. The module includes a communication board that includes a processing unit which is connected via an input/output bus slave and an external input/output bus connected to a central processing unit, and one or more secure processing units arranged on one or more circuit boards having safety oriented input/output circuits for safety oriented functions. A serial communication master is connected via communication links to at least one of the circuit boards so that the at least one circuit board receives messages sent by the communication board, transmits safety oriented messages from and/or to the processing unit of the communication board via one of the secure processing units.

20 Claims, 3 Drawing Sheets

(56) References Cited

U.S. PATENT DOCUMENTS

| | | | |
|---|---|---|---|
| 7,319,406 | B2 | 1/2008 | Vazach et al. |
| 7,430,451 | B2 | 9/2008 | Muneta et al. |
| 8,010,213 | B2 * | 8/2011 | Moddemann ............... 700/79 |
| 8,055,814 | B2 | 11/2011 | Sichner et al. |
| 2002/0022909 | A1 * | 2/2002 | Karem ............................... 701/3 |
| 2002/0126620 | A1 | 9/2002 | Heckel et al. |
| 2004/0210326 | A1 | 10/2004 | Muneta et al. |
| 2005/0063114 | A1 | 3/2005 | Suhara et al. |
| 2006/0224811 | A1 | 10/2006 | Sichner et al. |
| 2008/0126636 | A1 * | 5/2008 | Lehzen .......................... 710/105 |
| 2008/0306613 | A1 | 12/2008 | Muneta et al. |
| 2009/0119437 | A1 * | 5/2009 | Hilscher ....................... 710/305 |

FOREIGN PATENT DOCUMENTS

| | | |
|---|---|---|
| DE | 10 2004 056 363 A1 | 6/2006 |
| DE | 10 2004 061 013 A1 | 7/2006 |
| DE | 10 2008 058 090 A1 | 5/2010 |
| EP | 1 396 772 A1 | 3/2004 |
| EP | 1 703 346 A2 | 9/2006 |

OTHER PUBLICATIONS

International Search Report (PCT/ISA/210) issued on May 25, 2011, by the European Patent Office as the International Searching Authority for International Application No. PCT/EP2010/006520.

* cited by examiner

SAFETY MODULE FOR AN AUTOMATION DEVICE

RELATED APPLICATIONS

This application is a continuation under 35 U.S.C. §120 of International Application PCT/EP2010/006520 filed on Oct. 26, 2010 and designating the U.S., which claims priority to German Application 102009054155.1 filed on Nov. 23, 2009. The contents of which are hereby incorporated by reference in their entireties.

FIELD

The disclosure relates to an automation device, such as a safety module for connection to an automation system or automation device, wherein the automation system is provided for the control of safety critical and non-safety critical processes and/or plant components.

BACKGROUND INFORMATION

Automation systems for controlling a technical process or a technical plant, are known to specify control of safety critical process or plant components separately from non-safety critical components. The modules specified for this purpose such as safety oriented controllers and safe input/output modules connected thereto, also called I/O safety modules, are disclosed, for example, in DE 10 2004 061 013 A1. The input/output modules described therein have additionally, apart from control interfaces, means for monitoring the redundantly designed field device access modules integrated in the input/output modules, wherein the field device access module is connected to the monitoring means by means of one of the control interfaces and the monitoring means communicates with a controller via further control interfaces. The field device access modules are designed, for example, as standard modules for detecting process data.

Further safe input/output modules are described in EP 1 703 346 A2 and U.S. Pat. No. 7,319,406 B2. The safety modules operating as input/output units, shown there, have no further non safety oriented communication board for transmitting secure and non-secure data from/to a central processing unit. Thus, a simple option for defining a standard interface for secure and non-secure input/output modules is missing in the above mentioned systems.

It is also often difficult to separate the safety critical functions unambiguously from the non-safety critical functions.

The secure input/output modules described above are not suitable for application in modularly constructed control systems as described, for example, in DE 102004056363 A1 or, respectively, can only be integrated into an existing modularly constructed control system by means of an additional hardware and development expenditure.

SUMMARY

An exemplary safety module for connection to an automation device or automation system which is provided for control of safety critical and non-safety critical processes and/or plant components is disclosed, comprising: a communication board that includes a processing unit which is connected via an input/output bus slave and an external input/output bus connected thereto to a central processing unit; one or more secure processing units arranged on one or more circuit boards having safety oriented input/output circuits for safety oriented functions; a serial communication master connected via at least one communication link connectable to at least one of the circuit boards so that the at least one circuit board receives messages sent by the communication board, wherein each circuit board includes at least one internal communication slave connected to the serial communication master via the internal communication link; plural field devices for safety critical processes and/or plant components are connected to the safety oriented input/output circuits via an interface; a synchronization link that synchronizes the secure processing units; and at least one second internal communication link that transmits safety oriented messages from and/or to the processing unit of the communication board via one of the secure processing units located on the circuit boards for the safety oriented functions.

An exemplary central or decentralized input/output device in an automation device or automation system of a process automation or machine control is disclosed, comprising: a communication board that includes a processing unit which is connected via an input/output bus slave and an external input/output bus connected thereto to a central processing unit; one or more secure processing units arranged on one or more circuit boards having safety oriented input/output circuits for safety oriented functions; a serial communication master which is connected via at least one communication link to at least one of the circuit boards so that the at least one circuit board receives messages sent by the communication board, wherein each circuit board includes at least one internal communication slave connected to the serial communication master via the internal communication link; further field devices for at least one of safety critical processes and plant components are connected to the safety oriented input/output circuits via an interface; a synchronization link that synchronizes the secure processing units; and at least one second internal communication link that transmits safety oriented messages from and/or to the processing unit of the communication board via one of the secure processing units located on the circuit boards for the safety oriented functions.

An exemplary safety module for connection to an automation device or automation system which is provided for control of at least one of safety critical and non-safety critical processes and plant components is disclosed, comprising: a communication board that includes a processing unit which is connected via an input/output bus slave and an external input/output bus connected thereto to a central processing unit; one or more secure processing units arranged on one or more circuit boards having safety oriented input/output circuits for safety oriented functions; a serial communication master connected via at least one communication link connectable to at least one of the circuit boards so that the at least one circuit board receives messages sent by the communication board, wherein each circuit board includes at least one internal communication slave connected to the serial communication master via the internal communication link; and at least one second internal communication link that transmits safety oriented messages from and/or to the processing unit of the communication board via one of the secure processing units located on the circuit boards for the safety oriented functions.

BRIEF DESCRIPTION OF THE DRAWINGS

The disclosure and advantageous embodiments and improvements of the disclosure will be explained in greater detail and described by means of the exemplary embodiments shown in the following figures, in which.

DETAILED DESCRIPTION

Figure 1:
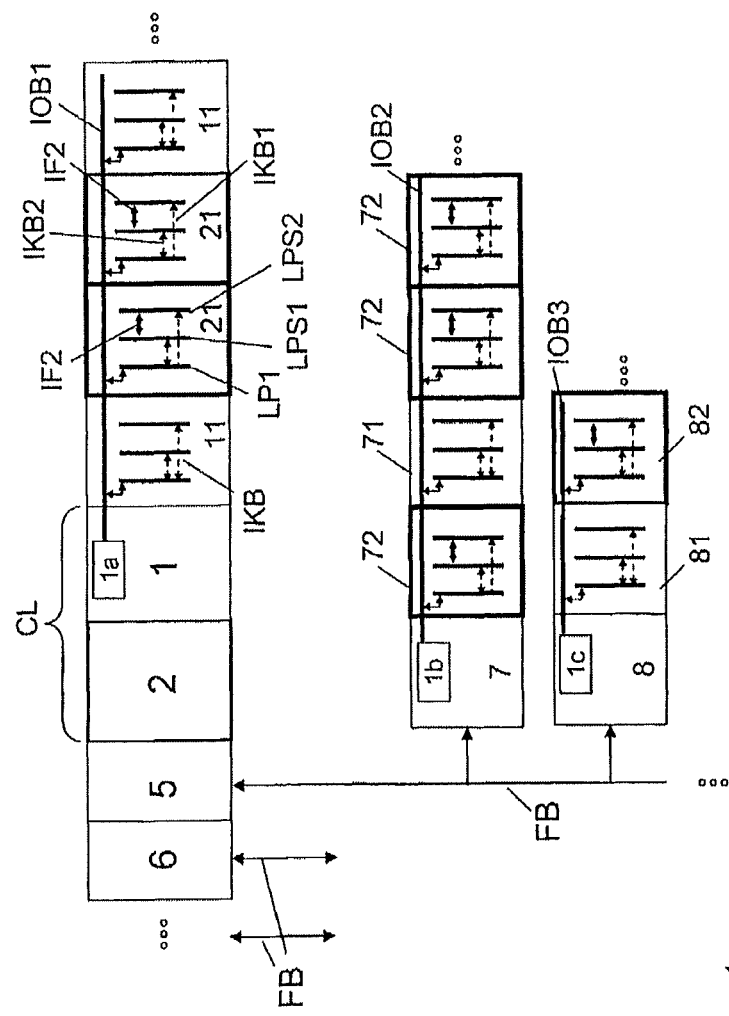
FIG. 1 shows a modularly constructed control system for the control of safety oriented and non-safety oriented processes by means of the safety modules in accordance with an exemplary embodiment of the present disclosure.

Accordingly, exemplary embodiments of the present disclosure specify a secure input/output module which can be applied in modularly configured automation systems for controlling safety critical and non-safety critical processes and/or plant components and avoids the aforementioned disadvantages. In particular, the safety module according to an exemplary embodiment of the present disclosure, also called input/output safety module or I/O safety module in the text which follows, should be suitable for equipping an existing modularly constructed non secure control system with an input/output safety module in a simple and cost effective manner.

An exemplary input/output safety module according to the present disclosure is provided for connection to an automation device or automation system which can be applied for the control of safety critical and non-safety critical processes and/or plant components. The safety module can be both an input safety module, an output safety module or also an input and output safety module. The input/output safety module according to the disclosure is used especially in process automation or machine control The input/output safety module includes a communication board, the processing unit of which can be connected via an input/output bus slave and an external input/output bus connected thereto to a central processing unit (CL) which is provided for controlling the non-safety critical process and/or the non-safety critical plant components as well as for safety critical processes and/or the safety-critical plant components.

According to an exemplary embodiment disclosed herein an internal communication master is provided on a communication board. The master can be designed as a serial interface, which is connected via at least one first communication link connectable thereto and to secure processing units of one or a number of circuit boards having safety oriented input/output circuits for safety oriented functions in such a manner that at least one safety oriented circuit board can exchange messages with the communication board.

Furthermore, field devices for safety critical processes and/or plant components can be connected to the safety oriented input/output circuits via a corresponding interface.

Between the secure processing units, a synchronization link is provided for the synchronization or, respectively, for the data comparison with one another as a result of which the secure processing units mutually monitor and synchronize one another.

The monitoring and synchronization mechanisms can be designed, for example, in accordance with "PROFIsafe—Profile for Safety Technology on PROFIBUS DP and PROFINET IO Profile part, related to IEC 61784 3 3 Specification for PROFIBUS and PROFINET Version 2.4, March 2007, Order No.: 3.192b" or the like.

Furthermore, according to an exemplary embodiment of the present disclosure safety oriented messages can be transmitted only via one of the safety processors located on the circuit boards for the safety oriented functions and the corresponding internal communication slave to the processing unit of the communication board by means of at least one second internal communication link via the internal communication master. This ensures that only one of the safety processors sends the safety oriented messages to the internal communication master of the communication board.

In another exemplary embodiment of the present disclosure, the second internal communication link of the input/output safety module is constructed in such a manner that the messages sent by the communication board can also be received through it.

The communication board advantageously can handle the safety oriented communication via the external input/output busmaster, arranged on the central processing unit, by utilizing a black channel communication principle to the internal serial communication slaves of the circuit boards for the safety oriented functions, also called Safety Control Boards in the context of the present disclosure.

In this context, the communication board takes over the task for the safety oriented communication with the safety control boards, to forward the safety oriented messages to an external input/output busmaster arranged on a central processing unit, by means of an integrated safety layer.

For this purpose, the "Black Channel Communication principle" is used and provides for a secure transmission of safety oriented protocols and is known, for example, from "PROFIsafe—Profile for Safety Technology on PROFIBUS DP and PROFINET IO Profile part, related to IEC 61784 3 3 Specification for PROFIBUS and PROFINET, Version 2.4, March 2007, Order No.: 3.192b".

Due to the separation into communication board and safety modules, the safety oriented parts in input/output safety modules can be separated strictly from the non safety critical communication. This reduces the development expenditure of new I/O safety modules distinctly and the safety critical functions can be separated more strictly from the non-safety critical functions.

In another exemplary embodiment, an I/O safety module can be configured such that existing Safety Control Boards are equipped with the communication board described above and only the internal communication links are still added between the Safety Control Boards and the communication board.

In an exemplary embodiment of the present disclosure, the I/O safety module has a redundant internal 1oo2 (1 of 2) safety architecture including (e.g., consisting of) two safety processors having corresponding units for the exchange of data with one another. To provide a fast synchronization and/or monitoring between the safety processors, the units for data exchange can be constructed as dual port RAM. The dual port RAMs are constructed in such a manner that simultaneous read and/or write accesses are possible at the two access sides thereof so that simultaneous access is possible for two otherwise separate systems which operate with common data without the otherwise separate systems restricting each other in the access speed. This distinctly increases the access time to the safety oriented messages to be transmitted.

However, the input/output safety module can also be constructed in a safety structure different from the 1oo2 (1 of 2) architecture, for example as a 1oo3 (1 of 3) architecture etc. In the 1oo2 architecture described, the safety processor, which can also exchange messages directly with the communication board, is not capable of determining a Cyclic Redundancy Checksum (CRC—a method for determining a check value for data in order to be able to recognize errors in the transmission or storage), which is necessary for generating valid secure messages via an internal communication link. This CRC determination can only be carried out by the redundant processor and passed onto the first processor. This ensures that both processors collaborate in valid messages. This is determination can be used to guarantee the safety of the system in the case of a failure or faulty operation of one of the two processors of the safety controller.

The input/output safety module having at least two redundant processing units for the safety critical input and output circuits can be used as secure analog and/or digital I/O circuits flexibly for different functions, for example for connection to analog and/or digital inputs and outputs of the field devices, in accordance with the exemplary safety oriented input/output circuits on the safety control boards.

In larger automation systems of another exemplary embodiment disclosed herein, the input/output safety module can also be used as a decentralized input and/or output device in such a decentralized larger automation system or else as locally couplable input/output device in stand-alone automation devices.

A further advantage of the exemplary safety module according to the present disclosure is obtained from the fact that a modularly constructed control system for non-safety critical applications can also be upgraded for safety critical applications in a simple and cost effective manner without extensive hardware expenditure.

FIG. 1 shows a modularly constructed control system for the control of safety oriented and non-safety oriented processes by means of the safety modules in accordance with an exemplary embodiment of the present disclosure. FIG. 1 shows a modularly constructed control or automation system, respectively, having a first control unit 1 which is provided for controlling non safety-critical processes and/or non-safety critical plant components, having modules, connected thereto, of the central input/output units 11, 21 which are connected via a so called external input/output bus IOB1, preferably constructed as backplane bus, and an input/output busmaster 1*a*, integrated in the first control unit, in each case to the first control unit 1 and optionally to at least one communication coupler module 5, 6, constructed as field bus master coupler, which controls the communication via the field bus (FB) with a multiplicity of field bus slaves 7, 8 and input/output units 71, 72, 81, 82 connected thereto.

The bus master couplers 5, 6 are connected, for example, in each case via an internal coupler bus, which is constructed similarly to the communication coupler 5, 6, to the first control unit 1.

Furthermore, at least one second control unit 2, also called safety controller in the text which follows, is provided for the control of safety critical and/or safety critical plant components. To provide the safety oriented functions, the safety controller 2 comprises at least two processors and a first interface, which can be constructed as dual port RAM, wherein only one of the two processors is connected to the dual port RAM. The safety controller 2 communicates with the first control unit 1 via the dual port RAM.

The input/output units comprise both secure units 21, 72, 82 having a safety function and non-secure units 11, 71, 81 without safety function.

The first control unit 1, together with the safety controller 2, a voltage supply unit and a display and/or operating unit, forms a module for the central processing unit CL of a control or automation system, respectively.

Both the modules of the so called central input/output units 11, 21, connected directly to the module for the central processing unit CL, and the modules of the decentralized units 71, 72, 81, 82 can be constructed both as safety oriented and non-safety oriented devices in accordance with their function as already previously stated.

The decentralized units 71, 72, 81, 82 shown in FIG. 1 are also connected to one another in each case via a further input/output bus IOB2, IOB3, preferably constructed as backplane bus, the respective input/output bus IOB2, IOB3 being connected to the field bus via an input/output bus master 1*b*, 1*c* integrated in the field bus slave 7, 8.

In the input/output units 11, 21, 71, 72, 81, 82, three circuit boards LP1, LPS1, LPS2 are preferably integrated in each case which exchange data with one another via at least one internal communication link IKB, IKB1, IKB2. In this arrangement, data are only sent to the safety control boards via the first communication link IKB1. Data can be sent from and to the safety control boards via the second communication link IKB2. For this purpose, at least one internal communication slave is in each case provided on safety control boards, which slave can be connected to the internal communication links. The communication link IKB is only used in non-safety oriented input/output units 11, 71, 81 for non-safety oriented data transmission.

The electrical and/or mechanical construction of the input/output devices can correspond, for example, to the structure of the input/output modules described in DE 10 2008 058 090.

Based on an exemplary 1oo2 architecture of the control system shown in FIG. 1, the secure units 21, 72, 82 comprise, apart from the first circuit board LP1 for the non-safety oriented communication, two further circuit boards LPS1, LPS2 for the safety critical and safety oriented functions, respectively. Communication between the further circuit boards LPS1, LPS2 is carried out by means of a synchronization link IF2. For this purpose, at least two processing units, constructed as safety processors, with associated memories and clock generators, are provided on the further circuit boards LPS1, LPS2. The safety processors synchronize one another. The structure of the safety processors and their operation are known from the relevant prior art.

The central processing unit CL, like the input/output units 11, 21 and the communication couplers 5, 6, can be arranged by means of a module carrier on a base plate of different upgradeability, the input/output units 11, 21 being couplable directly to the central processing unit CL and the communication coupler 5, 6. The base plate also has a field bus terminal for a standard field bus connection to the decentralized units 7, 8 and/or decentralized stations.

In an exemplary embodiment of the present disclosure, the base plate is snapped onto a standard cup rail, wherein at least one of the input/output units 11, 21 can also be snapped onto the cap rail and can be plugged electrically and mechanically together with the respective base plate.

Exemplary embodiments of the present disclosure provide that modules of the central processing unit CL, of the input/output units 11, 21 and of the communication couplers 5, 6 can all be connected or are connected to one another electrically cablelessly via plug in connections. The central processing unit CL, the input/output units 11, 21 and the communication couplers 5, 6 can be connected or are connected detachably to one another preferably in each case by means of plug in and/or latching means.

Figure 2:
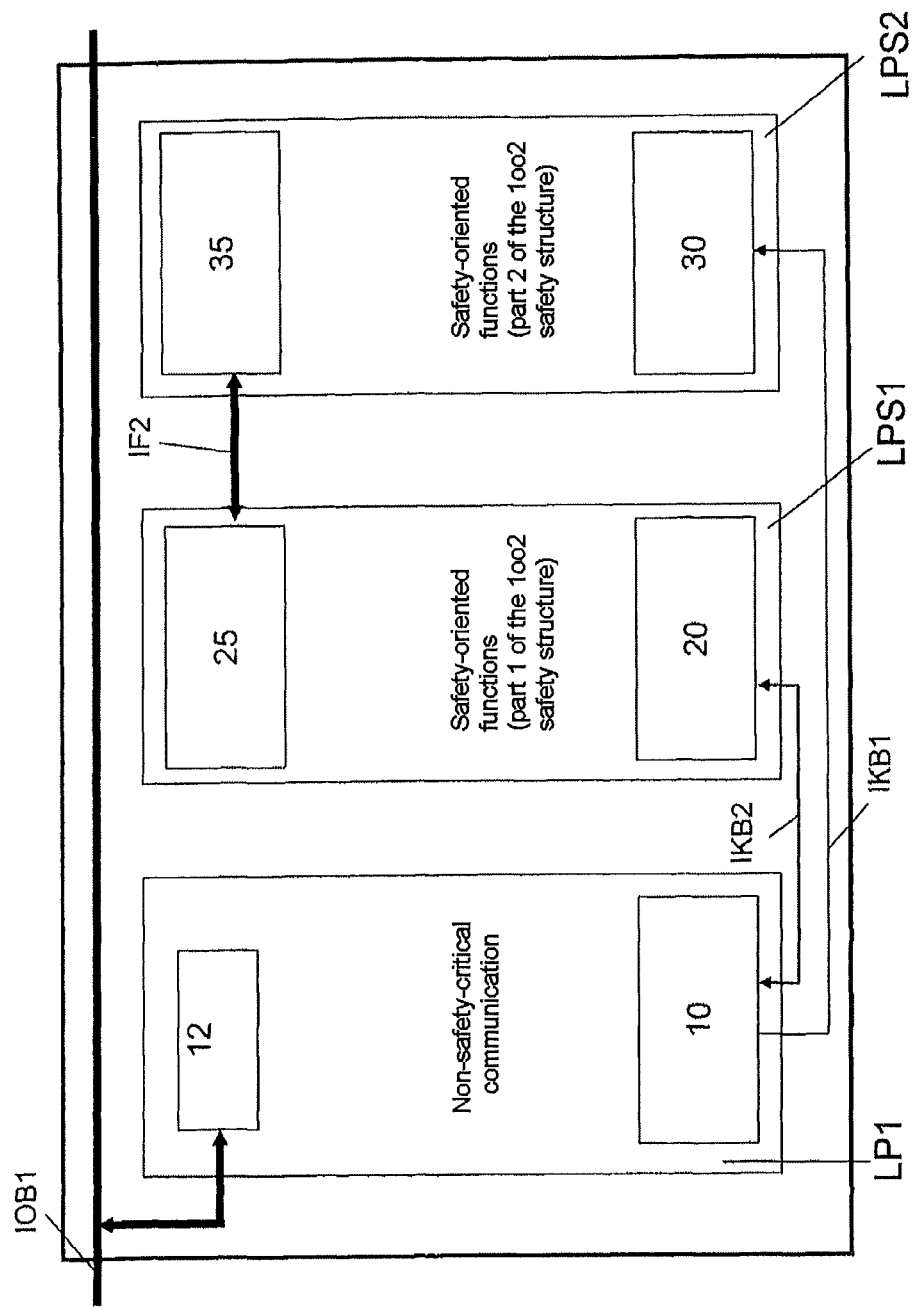
FIG. 2 shows a safety module in a 1oo2 (1 of 2) architecture and the communication within the safety module in accordance with an exemplary embodiment of the present disclosure.

FIG. 2 shows a safety module in a 1oo2 architecture and the communication within the safety module in accordance with an exemplary embodiment of the present disclosure. FIG. 2 shows a detailed embodiment of the I/O safety module according to the disclosure in a 1oo2 architecture with two redundant safety control boards LPS1, LPS2 and the communication within the safety module and via the input/output bus IOB1 and the input/output bus master 1 which can be connected thereto.

The input/output safety module comprises a first circuit board LP1, constructed as communication board, for providing the non-safety critical communication via an input/output bus slave 12 and the input and output bus IOB1, which can be connected thereto and is constructed as a backplane bus, having an internal communication master 10 and an internal communication link IKB1, IKB2 which can be connected thereto and is constructed as a serial interface.

The input and output bus IOB1 is provided for connecting the inventive I/O safety module to the central processing unit CL according to the exemplary embodiment represented in FIG. 1 via the input/output bus master 1a integrated in the central processing unit.

The communication board LP1 is connected via the internal communication link IKB1, IKB2 to two circuit boards LPS1, LPS2 having safety oriented input/output circuits for safety oriented functions, which are also designated as safety control boards. Safety oriented functions of the safety control boards are, for example, self-monitoring measures in the input/output safety module, like comparison tests between the channels, self-tests, plausibility tests, but also monitoring for voltage failure, short circuit, overvoltage or transgression of range.

On the safety control boards LPS1, LPS2, a safety oriented application 25, 35 is executed which is used for processing secure signals in secure input/output units.

Between the safety control boards LPS1, LPS2, a synchronization link IF2 is provided for data exchange or synchronization, respectively.

Figure 3:
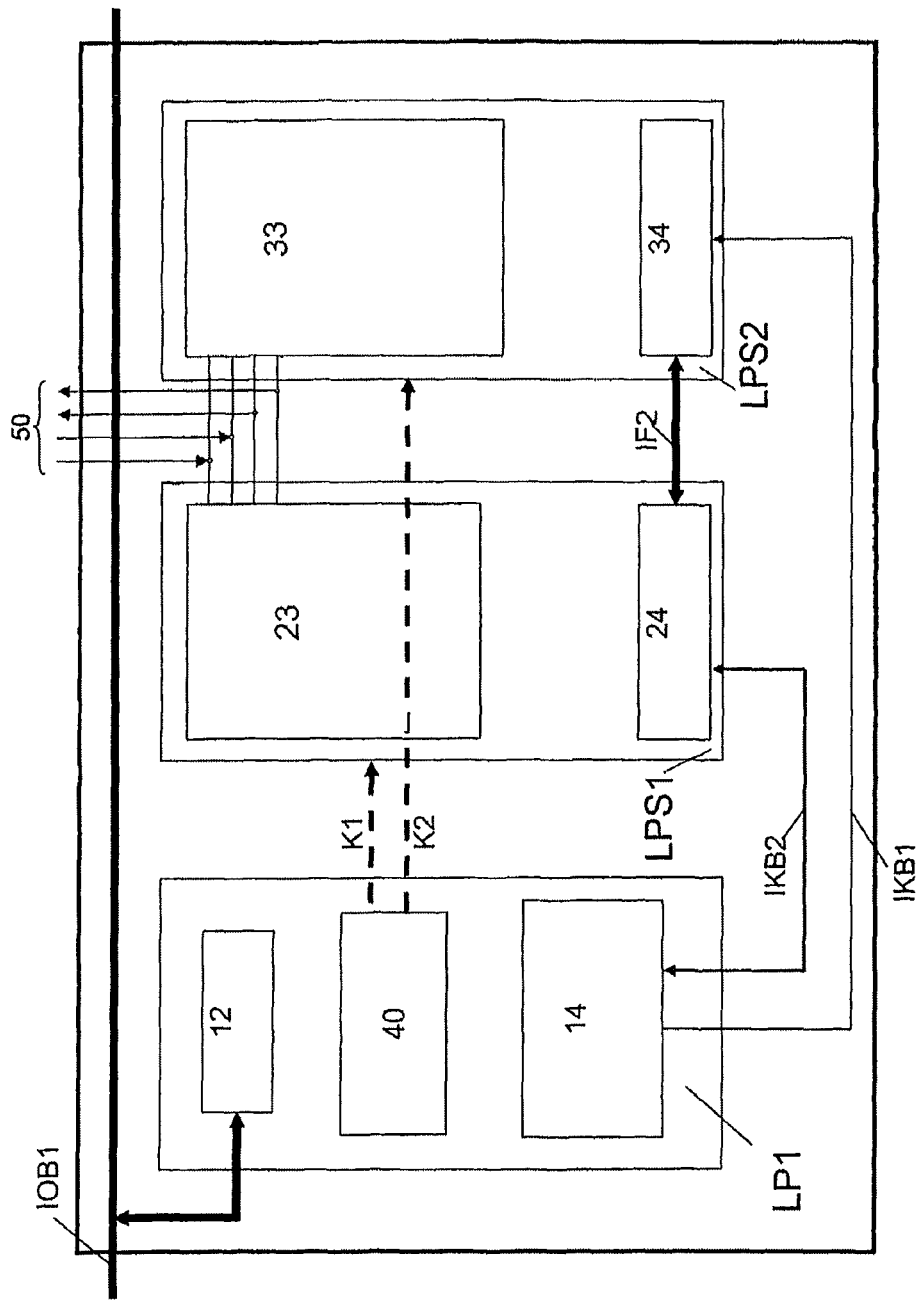
FIG. 3 shows a hardware structure of the safety module based on a 1oo2 (1 of 2) safety structure in accordance with an exemplary embodiment of the present disclosure.

FIG. 3 shows a hardware structure of the safety module based on a 1oo2 safety structure in accordance with an exemplary embodiment of the present disclosure.

As shown in FIG. 3, the exemplary hardware structure of the safety module, shown here, is based on a 1oo2 safety structure with the first processing unit 14 arranged on the communication board LP1 and the safety processors 24, 34, arranged in each case on the safety control boards LPS1, LPS2 which, in the text which follows, are called first safety processor 24, arranged on the first safety control board LPS1, and second safety processor 34, arranged on the second safety control board LPS2.

The processing units 24, 34 constructed as safety processors are in each case allocated corresponding memories and clock generators. The safety processors 24, 34 are constructed in such a manner that they monitor each other. For this purpose, the processors 24, 34 synchronize one another via the synchronization link IF2.

One of the two safety processors 24, 34, the first safety processor 24 of the first safety control board LPS1 in the example shown, is connected via a separate internal communication channel, also called second internal communication link IKB2, to the communication board LP1 in such a manner that the communication board LP1 can exchange the safety oriented messages with the safety control board LPS1.

For the purpose of voltage monitoring, for example for overvoltage or voltage failure, a monitoring unit 40 is provided which is arranged on the communication board and is in each case connected to the input/output circuits 23, 33, arranged on the safety control boards LPS1, LPS2, via the links K1, K2 in order to thus provide for voltage monitoring in the input/output safety module.

Due to the redundant arrangement of the safety processors 24, 34, only the first safety processor 24 of the first safety control board LPS1 is constructed in the present exemplary embodiment to transmit safety oriented messages to the processing unit 14 of the communication board LP1 via the internal second communication link IKB2.

In the 1oo2 architecture described, the safety processor 24, which can exchange messages directly with the communication board LP1, is not capable of calculating a Cyclic Redundancy Checksum (CRC—a method for determining a test value for data in order to be able to recognize errors in the transmission or storage), which is necessary for generating valid secure messages via an internal communication link. This CRC calculation can only be carried out by the redundant processor 34 and passed onto the first processor 24 via internal connection IF2. This ensures that both processors collaborate in valid messages. This can be called for in order to guarantee the safety of the system in the case of a failure or faulty operation of one of the two processors of the safety controller.

To safety control boards LPS1, LPS2, field devices for safety critical processes and/or plant components, also called safety oriented field devices, can be connected via an interface 50 by means of the secure input/output circuits 23, 33 monitoring one another, and via the input/output bus slave 12 and the external input/output bus IOB1, connected thereto, the central processing unit (CL) can be connected, for example.

Secure input and/or output channels with interface 50 are distributed redundantly on both secure circuit boards LPS1, LPS2 and processed with the aid of secure circuits 23, 33 of secure processing units 24, 34.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A safety module for connection to an automation device or automation system which is provided for control of safety critical and non-safety critical processes and/or plant components, comprising:

one or more circuit boards having safety-oriented input/output circuits for safety-oriented functions;

a communication board for providing non-safety-critical communication that includes a processing unit, which is connected to a central processing unit via an input/output bus slave and an external input/output bus, and that further includes a serial communication master;

one or more secure processing units arranged on the one or more circuit boards having safety oriented input/output circuits for safety oriented functions, wherein the serial communication master is connected via at least one first internal communication link connectable to at least one of the circuit boards so that the at least one circuit board includes at least one internal communication slave connected to the serial communication master via the at least one first internal communication link;

plural field devices for safety critical processes and/or plant components are connected to the safety oriented input/output circuits via an interface;

a synchronization link that synchronizes the secure processing units; and at least one second internal communication link that transmits safety oriented messages from and/or to the processing unit of the communication board via one of the secure processing units located on the circuit boards for the safety oriented functions.

2. The safety module as claimed in claim 1, wherein each secure processing unit is connected to the serial communication master of the communication board via an internal communication slave and the internal communication links.

3. The safety module as claimed in claim 1, wherein the safety module can be connected via the input/output bus to an input/output bus master of a control unit which is provided for the control of the non-safety critical process and/or of the non-safety critical plant components and also for safety critical and/or safety critical plant components.

4. The safety module as claimed in claim 3, wherein safety oriented messages can be transmitted from and to the circuit boards by utilizing the black channel communication principle via the external input/output busmaster and the internal serial communication slave of the circuit boards also for the safety oriented functions.

5. The safety module as claimed in claim 1, wherein the second internal communication link is constructed in such that the messages sent by the communication board can also be received via the communication board.

6. The safety module as claimed in claim 1, wherein the mutual synchronization and/or monitoring of the secure processing units can be carried out via at least one synchronization link.

7. The safety module as claimed in claim 1, wherein of the secure processing units, only one processing unit sends safety oriented messages directly to the communication master of the communication board via the second internal communication link.

8. The safety module as claimed in claim 1, wherein the safety module is connected to a modularly constructed control system.

9. The safety module as claimed in claim 2, wherein the second internal communication link is constructed in such that the messages sent by the communication board can also be received via the communication board.

10. The safety module as claimed in claim 2, wherein the mutual synchronization and/or monitoring of the secure processing units can be carried out via at least one synchronization link.

11. The safety module as claimed in claim 2, wherein of the secure processing units, only one processing unit sends safety oriented messages directly to the communication master of the communication board via the second internal communication link.

12. The safety module as claimed in claim 2, wherein the safety module is connected to a modularly constructed control system.

13. The safety module as claimed in claim 3, wherein the second internal communication link is constructed in such that the messages sent by the communication board can also be received via the communication board.

14. The safety module as claimed in claim 3, wherein the mutual synchronization and/or monitoring of the secure processing units can be carried out via at least one synchronization link.

15. The safety module as claimed in claim 3, wherein of the secure processing units, only one processing unit sends safety oriented messages directly to the communication master of the communication board via the second internal communication link.

16. The safety module as claimed in claim 3, wherein the safety module is connected to a modularly constructed control system.

17. A central or decentralized input/output device in an automation device or automation system of a process automation or machine control comprising:
   one or more circuit boards having safety-oriented input/output circuits for safety-oriented functions;
   a communication board for providing non-safety-critical communication that includes a processing unit, which is connected to a central processing unit via an input/output bus slave and an external input/output bus, and that further includes a serial communication master;
   one or more secure processing units arranged on the one or more circuit boards having safety oriented input/output circuits for safety oriented functions, wherein the serial communication master which is connected via at least one first internal communication link to at least one of the circuit boards so that the at least one circuit board includes at least one internal communication slave connected to the serial communication master via the at least one first internal communication link;
   field devices for at least one of safety critical processes and plant components are connected to the safety oriented input/output circuits via an interface;
   a synchronization link that synchronizes the secure processing units; and
   at least one second internal communication link that transmits safety oriented messages from and/or to the processing unit of the communication board via one of the secure processing units located on the circuit boards for the safety oriented functions.

18. A safety module for connection to an automation device or automation system which is provided for control of at least one of safety critical and non-safety critical processes and plant components, comprising:
   one or more circuit boards having safety-oriented input/output circuits for safety-oriented functions;
   a communication board for providing non-safety-critical communication that includes a processing unit which is connected to a central processing unit via an input/output bus slave and an external input/output bus, and that further includes a serial communication master;
   one or more secure processing units arranged on the one or more circuit boards having safety oriented input/output circuits for safety oriented functions, wherein the serial communication master connected via at least one first internal communication link connectable to at least one of the circuit boards so that the at least one circuit board includes at least one internal communication slave connected to the serial communication master via the at least one first internal communication link; and
   at least one second internal communication link that transmits safety oriented messages from and/or to the processing unit of the communication board via one of the secure processing units located on the circuit boards for the safety oriented functions.

19. The input/output device as claimed in claim 18, comprising:
   plural field devices for safety critical processes and/or plant components are connected to the safety oriented input/output circuits via an interface.

20. The input/output device as claimed in claim 17, comprising:
   a synchronization link that synchronizes the secure processing units.

* * * * *